Patented June 2, 1953

2,640,846

UNITED STATES PATENT OFFICE 2,640,846

PROCESS FOR PREPARING ORGANIC ISOCYANATES

Melvin D. Hurwitz, Philadelphia, and Robert W. Auten, Jenkintown, Pa., assignors to Rohm & Haas Company, Philadelphia, Pa., a corporation of Delaware No Drawing. Application June 30, 1950, Serial No. 171,557

5 Claims. (Cl. 260—453)

This invention relates to a novel process for preparing organic isocyanates.

This process comprises dehydrohalogenating a substituted N-halo-formamide having the general formula

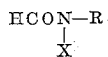

in which X represents an atom of chlorine or bromine and R represents a monovalent organic radical, preferably a hydrocarbon radical. The reaction which takes place by the preferred process is represented by the following equation:

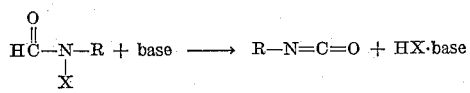

It is to be noted that the substituted N-haloformamide is dehydrohalogenated and that the reaction proceeds to completion as the liberated halogen acid is bound by the base or is otherwise removed. It is also to be noted that the radicals which are represented above by R remain intact and are not affected by the conditions of operation. Since the groups represented by R are unaffected, this novel process gives rise to excellent yields of a wide variety of isocyanates which differ from each other only as regards the inert R-groups. The same procedure, as is described in detail in the examples below, is followed regardless of whether the group R in the N-halo-formamide is a simple alkyl group such as a methyl group or is a higher substituted group such as a nitro-phenyl group or actually contains a second formamide group as in the case of 1,8-di-(N-chloroformamido)-p-menthane,

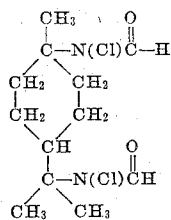

The substituted N - halo - formamides, HCON(X)R, from which the isocyanates are made according to this invention, are themselves new compounds and are the subject of another application, Serial No. 239,636, filed in the names of Melvin D. Hurwitz and Robert W. Auten on July 31, 1951. They are formamides which have both a halogen group and a monovalent, inert organic radical, preferably a monovalent hydrocarbon group, attached to the amido-nitrogen atom. They are most conveniently prepared by treating a substituted formamide carrying on its amido-nitrogen atom said monovalent organic radical and having the general formula, HCONHR, with a hypohalite, preferably with a tertiary-alkyl hypohalite. The intermediate substituted formamides are themselves best prepared by the comparatively new process of reacting an olefin with hydrogen cyanide, water, and sulfuric acid.

The process of this invention is carried out commercially with ease and high efficiency and with practically no corrosion of equipment. In these respects it has definite advantages over such well known methods as those involving the reaction of amines with phosgene or the Hofmann degradation, or rearrangement, of amides to amines.

The group represented by R in the above formulas of the N-halo-formamide and of the isocyanate is one which is inert in the accepted sense that it does not in itself undergo extraneous reaction under the conditions for converting the formamide to the isocyanate and does not, therefore, give rise to by-products. It is preferred that the N-halo-formamide be one in which the R-group is a hydrocarbon group such as an alkyl, cycloalkyl, aryl, aralkyl or alkaryl group. Thus, examples of operable N-haloformamides include those in which R represents the following hydrocarbon groups: Methyl, ethyl, isopropyl, sec.-butyl, tert.-amyl, n-octyl, diisobutyl, lauryl, tetradecyl, octadecyl, and the isomeric alkyl groups of the foregoing; cyclohexyl and cyclopentyl groups; phenyl, naphthyl, and anthracyl groups; benzyl and phenyl-ethyl groups; tolyl, ethylphenyl, p-butylphenyl, p-diisobutylphenyl groups; and the like. While the formamides in which R represents a hydrocarbon group are much preferred due to the inertness of the hydrocarbon portion, formamides are also operable in which the R-substituent contains other elements besides carbon and hydrogen. Thus, R can represent, for example, an aromatic radical such as the nitrophenyl or chlorophenyl groups, or it may contain a second N-haloformamido group as in the case of 1,8-di-(N-chloroformamido)-p-menthane made by first reacting di-pentene or alpha terpineol or terpin hydrate with water, hydrogen cyanide, and sulfuric acid to form 1,8-di-(N-formamido)-p-menthane and then chlorinating this with a tertiary-alkyl hypochlorite.

The N-halo-formamides are best converted to the isocyanates under anhydrous conditions in the presence of a dehydrohalogenating agent which promotes dehydrohalogenation catalytically or preferably which reacts and bonds the hydrohalogen as the latter is liberated. Particularly suitable for this purpose are compounds such as pyridine, quinoline, and other tertiary amines. Ideal tertiary amines are those of the formula $R_1R_2R_3N$ in which $R_1$, $R_2$, and $R_3$ are hydrocarbon groups such as those exemplified above in connection with the character R. Typical satisfactory tertiary amines include triethylamine, benzyldimethylamine, and dimethylaniline. Primary and secondary amines cannot be recommended because they give rise to the formation of by-products due to the reactivity of their amino-hydrogen atoms. Dehydrohalogenating catalysts such as aluminum chloride and ferric chloride have been used successfully. Solid sodium hydroxide or potassium hydroxide can be used particularly in the presence of an inert solvent. As a matter of fact, aqueous sodium hydroxide has been used with some degree of success although it is preferred to conduct the reaction under anhydrous conditions. What is essential is that the N-haloformamide be dehydrohalogenated and for this purpose conventional agents, catalysts, conditions, and techniques which cause or encourage dehydrohalogenation can be used to advantage. In fact, heating of the N-halo-formamides alone under reduced pressure brings about their dehydrohalogenation to some extent. The use, however, of a dehydrohalogenating agent—particularly an organic agent—gives much more satisfactory results and better yields of the isocyanates; and the use therefor of such a material is recommended in amounts equivalent to or in slight excess over the amount of N-halo-formamide which is to be converted to the isocyanate. Actually, a large excess of a suitable organic base or tertiary amine is not objectionable since it serves as a solvent for the reaction mixture.

The N-halo-formamides are converted to the isocyanates preferably under the influence of heat although some dehydrohalogenation takes place slowly in the presence of a dehydrohalogenating agent at temperatures as low as 0° C. Actually, it is preferred to conduct the reaction at a temperature from room temperature (about 20° C.) to about 100° C. While higher temperatures accelerate the rate of dehydrohalogenation, they also cause the decomposition of the N-haloformamide and the isocyanate to undesirable by-products. Consequently, a maximum temperature of 200° C. or one just below the decomposition of the particular isocyanate in preparation should not be exceeded.

Very satisfactory results have been obtained under normal atmospheric pressure but either reduced or superatmospheric pressures can be employed. Currently, however, there does not appear to be any marked advantage in altering the pressure, particularly when an efficient acid-acceptor or dehydrohalogenating agent such as pyridine is present.

Likewise, if desired, the reaction can be carried out in the presence of inert solvents, such as carbon tetrachloride, benzene, toluene, petroleum ether, mineral spirits, and the like.

The following examples serve to illustrate preferred methods of preparing particular isocyanates, but it is to be noted that all of the N-haloformamides described above are converted into isocyanates by the processes described hereinafter and that the scope of the invention is not limited by the particular examples.

EXAMPLE 1

*Preparation of N-butyl-N-chloroformamide*

Into a three-necked flask equipped with thermometer, mechanical stirrer and reflux condenser was charged 1.5 moles of n-butylformamide, $HCONH—C_4H_9$. To this was added dropwise through the condenser 1.57 moles of tert.-butyl hypochlorite. An exothermic reaction occurred rapidly and the temperature was maintained within the range of 20° C. to 35° C. by means of an ice-bath. When the exothermic reaction had subsided, the mixture was held at room temperature for an hour, after which the butanol was stripped off under reduced pressure. There was thus obtained a 98.5% yield of N-butyl-N-chloroformamide having a purity of 94.8%, as evidenced by determination of chlorine.

In the same way and by the use of tert.-butyl hypochlorite, methyl-, tert.-butyl-, tert.-octyl-, and dodecyl-formamides were converted to the corresponding N - chloro - N - alkylformamides with the liberation of tert.-butanol. Also these substituted formamides are converted to the corresponding N-bromoformamides by the mere substitution of a tert.-alkyl hypobromite, such as tert.-amyl hypobromite, for the tert.-butyl hypochlorite used above.

EXAMPLE 2

Into a three-necked flask equipped with stirrer, dropping funnel, thermometer, and take-off condenser leading to an ice-cooled collecting flask were charged one mole of quinoline and 0.16 mole of N-methyl-N-chloroformamide. Heat was applied and 0.48 mole of N-methyl-N-chloroformamide was slowly dropped into the reaction mixture. The reaction became exothermic at 80°–85° C. and external heating was discontinued until the exotherm had diminished and all of the chloroformamide had been added. Heat was then applied and the product was distilled directly from the reaction mixture. A 66% yield of crude methyl isocyanate was obtained which was purified by redistillation.

EXAMPLE 3

By the procedure of Example 2 0.5 mole of N-butyl-N-chloroformamide was mixed and reacted with 0.55 mole of pyridine. An exothermic reaction took place at 72° C. and the mixture was held at 72°–75° C. by use of an ice-bath until the reaction was complete. The product was distilled from the reaction flask under a pressure of 100 mm. and was thereafter redistilled at atmospheric pressure. A 72% yield of butyl isocyanate boiling at 115.5–116° C. was obtained.

In a similar experiment, essentially the same results were obtained by using N-butyl-N-bromoformamide in place of the N-butyl-N-chloroformamide and there does not appear to be at this time any advantage in using the more expensive bromo-derivative.

EXAMPLE 4

The procedure of Example 2 was followed in reacting a mixture of 1.08 mole of N-tert.-butyl-N-chloroformamide and 1.2 moles of quinoline. The mixture was slowly and cautiously heated to 83°–98° C. and held within this range for an hour. The product was distilled directly from the reaction flask under a pressure of 100 mm. and was then redistilled at atmospheric pressure to give a yield of 54.7% of tert.-butyl isocyanate boiling at 84°–85° C.

EXAMPLE 5

By the procedure described above 0.15 mole of N-tert.-octyl-N-chloroformamide having the formula

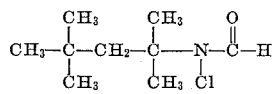

was mixed with 0.45 mole of pyridine and 0.5 mole of benzene and the mixture was heated cautiously to refluxing temperature in a flask equipped with stirrer, thermometer, dropping funnel, and reflux condenser. After a refluxing period of two hours the mixture was filtered, stripped of benzene by distillation, and the product was purified by distillation. A 57% yield of tert.-octyl isocyanate, boiling at 167°–170° C., was obtained. The composition was confirmed by analysis. This compound is new.

This same procedure was followed in preparing dodecyl isocyanate from N-dodecyl-N-chloroformamide by heating one mole of the latter with 1.1 moles of pyridine.

EXAMPLE 6

A mixture of 0.8 mole of N-butyl-N-chloroformamide and 4 moles of benzene was placed in a flask equipped with stirrer, dropping funnel, reflux condenser, and thermometer. To this was added slowly 1.2 moles of triethylamine. A mild exothermic reaction occurred which was easily controlled, and the temperature was carried to 42°–45° C., where it was held for two hours. Thereafter the product was isolated by careful fractional distillation and a 62% yield was obtained of a compound (butyl isocyanate) identical with that obtained by the process of Example 3 above.

As is known, the isocyanates which are prepared by the process of this invention are valuable chemicals which are very reactive with primary and secondary amines, carboxylic acids and alcohols. They are also useful as components of adhesives wherein they promote adhesion and as modifiers for plastics, especially those of the nylon type.

We claim:

1. A process for preparing organic isocyanates having the formula R—NCO in which R is a monovalent hydrocarbon radical, which process comprises dehydrohalogenating, in the presence of an organic dehydrohalogenating agent which is free of primary and secondary amino groups, a substituted N-halo-formamide having the general formula

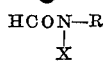

in which X is an atom of a halogen from the group consisting of chlorine and bromine and R has the significance described above.

2. A process for preparing alkyl isocyanates having the formula R—NCO which comprises dehydrochlorinating in the presence of an organic base which is free of primary and secondary amino groups a substituted N-chloroformamide having the general formula

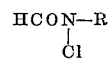

the character R representing in both formulas the same alkyl group.

3. A process for preparing alkyl isocyanates having the formula R—NCO which comprises dehydrochlorinating in the presence of pyridine a substituted N-chloroformamide having the general formula

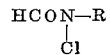

the character R representing in both formulas the same alkyl group.

4. A process for preparing alkyl isocyanates having the formula R—NCO which comprises dehydrochlorinating in the presence of quinoline a substituted N-chloroformamide having the general formula

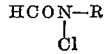

the character R representing in both formulas the same alkyl group.

5. A process for preparing alkyl isocyanates having the formula R—NCO which comprises dehydrochlorinating in the presence of triethylamine a substituted N-chloroformamide having the general formula

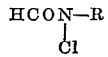

the character R representing in both formulas the same alkyl group.

MELVIN D. HURWITZ.
ROBERT W. AUTEN.

References Cited in the file of this patent

UNITED STATES PATENTS

| Number | Name | Date |
|---|---|---|
| 2,480,088 | Slocombe et al. | Aug. 23, 1949 |

OTHER REFERENCES

Montagne et al.: 1946 Chem. Abst., vol. 40 (5696).

Sperber et al.: J. Am. Chem. Soc., vol. 71, pgs. 3352–3353, (October 1949).